US006432181B1

(12) United States Patent
Ludwig

(10) Patent No.: US 6,432,181 B1
(45) Date of Patent: Aug. 13, 2002

(54) SILICONE COMPOSITIONS, METHODS OF MAKING AND USING VOC FREE, NON-FLAMMABLE CREAMS, PASTES AND POWDERS TO RENDER NONPOROUS SURFACES WATER, SOIL AND STAIN REPELLENT

(75) Inventor: Jerome H. Ludwig, Sun City West, AZ (US)

(73) Assignee: Resource Development, L.L.C., Scottsdale, AZ (US)

( * ) Notice: Subject to any disclaimer, the term of this patent is extended or adjusted under 35 U.S.C. 154(b) by 0 days.

(21) Appl. No.: 09/518,033

(22) Filed: Mar. 3, 2000

(51) Int. Cl.$^7$ .............................. C09D 5/00; C09D 7/02; C09K 3/18; C09G 1/04

(52) U.S. Cl. .......................... 106/2; 106/213; 106/270; 106/271; 106/272; 106/287.1; 106/287.11; 106/287.12; 106/287.13; 106/287.14; 106/287.15; 106/287.16; 106/10; 106/3; 516/123; 516/DIG. 1

(58) Field of Search ...................... 106/2, 3, 10, 270, 106/271, 272, 287.14, 287.11, 282.1, 287.12, 287.13, 287.15, 287.16; 252/315.01; 516/DIG. 1, 123

(56) References Cited

U.S. PATENT DOCUMENTS

| | | | |
|---|---|---|---|
| 2,512,458 A | 6/1950 | Fujisaki | 235/84 |
| 2,612,458 A | 9/1952 | Stedman | 117/92 |
| 2,923,653 A | 2/1960 | Matlin et al. | 154/101 |
| 2,962,390 A | 11/1960 | Fain et al. | 117/64 |
| 3,244,541 A | 4/1966 | Fain et al. | 106/13 |
| 3,579,540 A | 5/1971 | Ohlhausen | 260/33.4 |
| 3,817,769 A | 6/1974 | Fisher | 106/287 |
| 3,998,643 A | 12/1976 | Liddle | 106/2 |
| 4,343,857 A | 8/1982 | Uram, Jr. | 428/336 |
| 4,431,771 A | 2/1984 | Falender et al. | 524/863 |
| 4,594,109 A * | 6/1986 | Kawabata | 106/271 |
| 4,615,738 A | 10/1986 | Sanders, Jr. et al. | 106/13 |
| 4,837,261 A | 6/1989 | Hampe et al. | 524/268 |
| 5,021,089 A | 6/1991 | Kuwata et al. | 106/2 |
| 5,417,744 A | 5/1995 | Gasmena | 106/2 |
| 5,584,917 A | 12/1996 | Kijima et al. | 106/2 |
| 5,697,991 A | 12/1997 | Frazer | 51/306 |
| 5,759,618 A | 6/1998 | Taylor | 427/140 |
| 5,854,342 A | 12/1998 | Kirochko et al. | 524/805 |

FOREIGN PATENT DOCUMENTS

| | | | |
|---|---|---|---|
| AU | 70423/98 | 12/1998 | C03C/17/34 |
| AU | 76411/98 | 12/1998 | C03C/17/34 |
| DE | 196 49 479 | 6/1997 | C08L/83/04 |
| DE | 198 09 057 | 10/1998 | C03C/17/30 |
| EP | 0 166 396 | 1/1986 | C08L/83/06 |
| EP | 0 591 955 | 4/1994 | C08L/83/04 |
| EP | 0 914 302 | 10/1998 | C03C/17/30 |
| EP | 0 914 303 | 10/1998 | C03C/17/34 |

* cited by examiner

*Primary Examiner*—David Brunsman
(74) *Attorney, Agent, or Firm*—Wood, Herron & Evans, L.L.P.

(57) ABSTRACT

Silicone compositions are used for treating nonporous surfaces such as glass, porcelain, ceramic, polished or painted metal, plastic, and the like, to render them water, soil and stain repellent. Volatile organic compound (VOC) free cream, paste, powder and solid compositions are provided by the inclusion of stabilizers in the silicone compositions. Solventless silicone compositions provide numerous advantages and improved water/soil repellency qualities.

60 Claims, No Drawings

SILICONE COMPOSITIONS, METHODS OF MAKING AND USING VOC FREE, NON-FLAMMABLE CREAMS, PASTES AND POWDERS TO RENDER NONPOROUS SURFACES WATER, SOIL AND STAIN REPELLENT

FIELD OF THE INVENTION

This invention relates to silicone compositions and a method for treating nonporous surfaces such as glass, porcelain, ceramic, polished or painted metal, plastic, and the like, to render them water, soil and stain repellent. Volatile organic compound (VOC) free cream, paste, powder and solid compositions are provided.

BACKGROUND OF THE INVENTION

There has been extensive research and development involving silicone compositions for rendering nonporous surfaces water repellant. U.S. Pat. No. 2,612,458 (Stedman) discloses the application of substituted polysilicanes to windshields to achieve repellency. U.S. Pat. No. 2,923,653 (Stedman) discloses improved compositions employing alkoxy groups in the polysilicane to improve the repellency. U.S. Pat. No. 2,962,390 (Fain, et al.) describes a paste containing a solid rubbing agent and an alkyl alkoxy silane which when rubbed on a glass surface provides repellency. U.S. Pat. No. 3,244,541 (Fain, et al.) discloses acidic solutions of alkyl alkoxy silane monomers that produce rain repellent films on glass and which are also solvent resistant. U.S. Pat. No. 3,579,540 (Ohlhausen) discloses water repellent film-forming compositions of alkylpolysiloxanes and acid or alkylpolysiloxanes, acid and solvent which result in durable and effective water repellent films on nonporous substrates. This patent also discloses the importance of adding the acid to the alcohol to form the intermediate half ester and then to add the alkylpolysiloxane in order to solublize the alkylpolysiloxane and eliminate the formation of two or three phases in the mixture. It also discloses that the alkylpolysiloxanes can be employed with solvents, diluents and extenders including colloidal pyrogenic silicas and clays. Isopropyl alcohol solvent was preferred. U.S. Pat. No. 3,817,769 (Fisher) discloses a rapid curing repellent composition by use of dyes, i.e., methylene blue, to give a durable and tough polysiloxane film. However, films prepared in accordance with Fisher's examples gave poor repellency results unless sulfuric acid was also incorporated in the composition. U.S. Pat. No. 3,998,643 (Liddle), discloses the addition of hydrogen fluoride to the Ohlhausen compositions and processes with claimed improved repellency and durability.

U.S. Pat. No. 5,021,089 (Uwata, et al.), discloses a water repellent composition comprising a volatile organic solvent, a silyl phosphate and an organopolysiloxane, thus eliminating the mineral acid required in previously disclosed water repellent compositions. U.S. Pat. No. 5,417,744 (Gasmena) discloses a composition containing a fluorinated polysiloxane, a polysiloxane, a polyester modified polysiloxane, an acid, water and an alcohol to obtain an optically clear coating having hydrophobic properties. U.S. Pat. No. 5,584,917 (Kijima) discloses a water repellent composition comprising an amino group-containing polyorganosiloxane, an organic acid, a surfactant and an aqueous solvent. U.S. Pat. No. 5,697,991 (Frazer) discloses an alkypolysiloxane, mineral acid, solvent and a mild abrasive (0.5–3.0%, preferred 1%) as an improved water repellent treating compound wherein the abrasive serves to enhance dirt and grit removal. U.S. Pat. No. 5,759,618 (Taylor) discloses a strong phosphoric acid, hydrofluoric acid, sulfuric acid cleaning solution for glass surfaces prior to the application of an excess of an alkoxysilane/sulfuric acid solution to the glass surface with timing, temperature and humidity being critical for the removal of the excess in order to achieve an abrasive resistant, water repellent coating on the surface of the glass.

After almost three decades of research and development in water repellent silicone coatings, the dominant technology has involved the use of acidified solvent-based silicone compositions. A multitude of commercial products have been formulated and marketed utilizing some form of alkylsiloxane at about a 10% concentration and a mineral acid at about a 1% concentration and an alcoholic solvent. These alcoholic solutions all yield water repellent coatings on nonporous surfaces, particularly glass surfaces, by application directly onto the surface, usually by rubbing with a paper towel or cloth. Upon evaporation of the alcohol, a hazy film remains which is further polished with a dry wipe material to achieve the desired transparent water repellent coating. During the application process, the odor of the evaporating alcohol can be objectionable, particularly in the confined quarters of a shower or bathroom. OSHA recommends human exposure limits for most alcohols and other solvents to minimize health concerns, i.e., isopropanol (OSHA PEL: TWA 400 ppm, STEL 500 ppm) and ethanol (OSHA PEL: TWA 1000 ppm). These volatile solvents also contribute to air pollution and are considered to be undesirable volatile organic compounds (VOCs) by regulating authorities. These solvents have storage and handling limitations because they are also flammable and could ignite during application or form explosive mixtures if the vapors are confined.

Solvent-based silicone compositions currently have limited industrial application due to their flammability and the toxic vapor exposure to the workers. These solvent-based silicones require additional capital expenditures for explosion proof application equipment, exhaust equipment for vapor removal and scrubbing, and the monitoring of worker exposure to the solvent vapors.

The application of solvent-based silicone compositions utilizes excessive amounts of silicone per square foot of coverage provided due to the evaporation of the solvent and absorption of the silicone by the wipe material. Excessive amounts of the silicone remains in the wipe material and cannot be applied to the surface to be treated. The presence of solvents can also be incompatible with gaskets, paint, etc., associated with the surface being treated. Thus, a need exists for a water repellent composition that eliminates solvents and utilizes the silicone more effectively and economically.

The application of solvent-based silicone compositions also requires time for evaporation of the solvent and results in a hazy water repellent coating which is attributable to the separation of the acid, usually sulfuric acid, from the silicone on evaporation of the solvent. The resulting haze requires a second polishing step and/or dry wipe in order to achieve an optically clear coating. Thus, it is desirable to provide a composition that produces an optically clear water and soil repellent coating without excessive waiting, manpower or additional wiping.

The haze which develops upon application of a solvent based system to a nonporous surface and evaporation of the compatibilizing solvent results from the development of a silicone phase and a strong acid phase. This haze must then be wiped in order to intimately mix the silicone and acid phases onto the surface to remove the excess of the two phases and render it water and soil repellent.

Solvent-based silicone compositions also have storage temperature limitations. For example, alcoholic compositions in closed containers have been reported to "explode" due to the high storage temperatures that can sometimes occur in warehouses or during transport in closed trucks and the like which results in an increase in the internal vapor pressure in the container leading to rupture. Not only does this cause a loss of product and packaging material but it presents a potential hazardous flammable and/or explosive event. There further exists a need for a water repellent silicone composition which is free of volatile organic compounds (VOCs), or VOC compliant, and which is nonhazardous.

Most solvent-based silicone compositions contain the active ingredients at about a 10%/wt level. Thus, almost 90% of the composition is solvent and this requires a large container in order to deliver the product to the customer. The larger container in turn requires more packaging material, larger boxes, more warehouse space, higher shipping costs and more shelf space. It would be very desirable to provide a concentrated silicone composition which has associated with it reduced manufacturing, packaging, storage, transportation and related sales costs, and which provides significantly greater coverage on the surface to the treated.

When dilute solvent-based silicone compositions are applied to a hard surface and wiped to a polished water repellent coating, the silicone coating is very thin, on the order of a mono molecular layer. These thin coatings will not hide the fine scratches and other defects in the hard surface that has been coated. It would also be desirable to provide a silicone coating composition which will leave an optically clear multimolecular layer which can hide or fill the fine scratches and other defects in the nonporous surface being coated and which results in a restored appearance to the surface.

In view of the above state of the art on research and development of silicone compositions, a number of improvements are needed.

SUMMARY OF THE INVENTION

This invention is directed to an essentially solventless water and soil repellent composition for treating nonporous surfaces. The composition consists essentially of a multi-phase dispersion of a silicone and an acid. A solid stabilizer is distributed in the multi-phase dispersion in an effective amount to stabilize the dispersion against separation. This essentially solventless silicone composition thereby overcomes the many disadvantages presently associated with solvent-based silicone compositions as set forth in the background of this invention.

The water and soil repellent compositions of this invention are useful for treatment of a variety of nonporous surfaces including glass, porcelain, ceramic, polished or painted (coated) metal, plastic, and the like, to render them water and soil repellent. The existing needs in the consumer, commercial and industrial fields are fulfilled by compositions of this invention because they are VOC free or VOC compliant, economical, non-flammable, practical, easy to apply, haze-free upon application, capable of homogeneous delivery of the active ingredients and offer improved water/soil repellency qualities.

In another embodiment, the water and soil repellent compositions of this invention are formulated and used in the physical form of a cream, paste or powder. In this embodiment, an additive may be used, as described hereinafter, to dilute the silicone and/or the acid phase of the composition. However, in any of these physical forms, the solid stabilizer compatibilizes the phases against separation. These forms of the silicone compositions enable multi-molecular and transparent coatings to be formed on a variety of nonporous surfaces. Furthermore, these multi-layered coatings hide or fill fine scratches and other defects in the nonporous surface being coated. Thus, the compositions and methods of this invention enable the restoration of nonporous surfaces, such as glass, which develop fine scratches and other defects in use.

Methods of preparing the water and soil repellent compositions are also provided by this invention. In the solventless compositions, silicone compounds and neat acid (without solvent) are mixed with a solid stabilizer in an effective amount to compatibilize or couple the components in a homogeneous mixture. In some cases, it may be desirable to heat the mixture and/or employ high-shear mixing to achieve the desired intimate blending of the components to ensure stabilization. The resulting composition of silicone fluid, acid and stabilizer, may be a cream, paste, powder or solid, depending upon the most desired form for the intended application. It has been found that a solid stabilizer is most advantageously employed in the form of fine particles. The fine particles enable the intimate delivery of the silicone and acid in the proper proportion to the surface to be treated. The solid stabilizer is contained in an amount from about 5 to about 85 percent by weight of the composition depending on the product type desired, and preferably consists of particles having an average size of less than about 100 microns, more preferably about 5 to about 50 microns, and having a specific gravity on the order of about 0.12 to 2.9 gm/cc, more preferably for creams and pastes about 0.12 to about 1.8 gm/cc. A wide variety of silicones, acids and solid stabilizers may be utilized in accordance with the principles of this invention as understood with respect to the following detailed description.

DETAILED DESCRIPTION OF THE INVENTION

In accordance with the above summary, the objectives of this invention are to provide methods for rendering nonporous surfaces demonstrably water, soil and stain repellent with compositions of matter that are (1) non-flammable, VOC free or VOC compliant and essentially solventless, (2) more easily applied as a cream, paste or powder, (3) optically clear films, which may be multi-molecular to fill in microscopic surface scratches, (4) storage stable, (5) provide greater coverage per weight or volume applied, and (6) which are more durable and more resistant to removal by soaps, solvents, detergents and abrasives. These objectives are accomplished by stabilizing a multi-phase dispersion of a silicone and an acid against separation to form a stabilized cream, paste or powder by the use of a solid stabilizer distributed in the dispersion in an effective amount.

In accordance with a best mode of this invention, improved water and soil repellent, nonflammable, VOC free compositions for nonporous surfaces are prepared by mixing an organosilicone compound with an acid and an effective amount of a solid stabilizer in the absence of a volatile organic compound.

A. Silicones

Generally, the silicone fluids can be described by the formula (A):

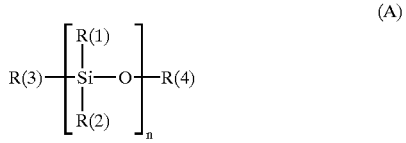

(A)

in which n is an integer from 1 to about 1000,

R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenoxy, halogenated alkylphenoxy, and combinations thereof.

Suitable organosilicone compounds include silicone fluids such as polydialkylpolysiloxanes, polyalkylpolyalkoxypolysiloxanes, polyalkylhydrogensiloxanes, polyalkylarylpolysiloxanes, organofunctional polysiloxanes, fluorosubstituted alkylpolysiloxanes, cyclic siloxanes, and the like having terminal trialkylsiloxy, dialkylarylsiloxy, dialkylsilanol, and other organofunctional groups, and the like, and combinations thereof. Suitable cyclic siloxanes are hexamethylcyclotrisiloxane, octamethylcyclotetrasiloxane and decamethylcyclopentasiloxane. Copolymer fluids such as polyalkylhydrodimethylsiloxanes are also suitable. The fluids need not be linear but may also be branched. These silicone fluids of various molecular weights are commercially available as described and are listed in the literature of silicone fluid suppliers such as Wacker Silicones Corporation, Adrian, Mich.; Gelest, Inc., Tullytown, Pa.; Petrarch Systems, Bristol, Pa.; General Electric Co., Waterford, N.Y.; Osi Specialties, Inc. (Witco Corporation), Danbury, Conn.; Genesee Polymers Corp., Midland, Mich.; Dow Coming Corp., Midland, Mich.; Allied Signal, Inc., Performance Chemicals Div., Morristown, N.J.; PCR, Inc., Gainsville, Fla.; etc.

The relative amounts of components will vary to achieve the objectives of this invention and, in general, the amounts, in percent by weight, are about 20 to about 85 silicone, about 2 to about 20 acid and about 8 to about 85 solid stabilizer. As set forth in the examples which follow for creams, the ranges (percent by weight) are about 57–83 silicone, about 7.4–15.3 acid and about 5.5–34.3 solid stabilizer. Pastes and semi-solids range (percent by weight) from about 33.6–80.5 silicone, about 2–12.5 acid and about 9–62.8 solid stabilizer. For powders, the silicone may be reduced, for example, to lower amounts of about 20 percent by weight with a higher amount of stabilizer, i.e., about 75 percent by weight and about 2–3 percent by weight of acid. However, the following examples illustrate and do not limit the scope of the invention.

B. Acids

Suitable acids which are encompassed by the present invention are both mineral acids and their acidic salts along with strong organic acids. Included are sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

In certain selected applications the acid component of the composition may be generated in situ by employing acid generating substances such as chlorosilanes, phosphorous trichloride, phosphorous tribromide, aluminum chloride, sulfonylchloride, acid chlorides, and the like, in the compositions of this invention. These materials react with the water which is adsorbed on the surface to be treated. This reaction generates (in situ) the strong acid required for the proper bonding of the silicone to the surface treated.

C. Solid Stabilizers

Solid stabilizers that have been found suitable for use in combination with the silicones and acids of the water and soil repellent compositions of this invention include mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof. It is desirable to have the solid stabilizers in a finely divided state to achieve the intimate delivery of the silicone and the acid in the proper proportion to the surface and to achieve the desired form of the composition for a particular end use application.

Particularly suitable solid stabilizers are those with particle sizes less than 100 microns, preferably in the 5–50 micron range, and having a specific gravity of about 0.12 to about 2.9 gm/cc, more preferably for creams and pastes about 0.12 to about 1.8 gm/cc in order to achieve good shelf life. The finer the particle size the less critical the specific gravity becomes.

Solid stabilizers must not be basic or reactive with acids. Such solids as powdered metals, metal oxides, metal carbonates, metal hydroxides, metallic soaps such as zinc stearate, amines, polyamino resins, and the like, would neutralize the acids in the compositions of this invention and deteriorate or prevent the bonding of the silicones to the surface to be treated.

On occasion, when making a cream, paste, powder or solid, it is desirable to admix the compositions of this invention with liquid or solid additives, including water, glycols, and the like, in order to achieve the desired performance of the composition, i.e., in order to achieve the desired coating thickness of the water and soil resistant coating on certain surfaces. In these cases, the additives will increase the silicone and/or the acid phases of the multiphase dispersion, but the solid stabilizer will still be effective in the composition. However, in order to achieve the advantages of a VOC free or solventless form of the compositions of this invention, solvents are essentially excluded. For example, in order to maintain the desirable features of being "VOC-free", the additives must meet Part 59 of the National Volatile Organic Compound Emission Standards for Consumer and Commercial Products; Section 59203 Standards for Consumer Products, Subpart (f) requirements:

(1) Has a vapor pressure of less than 0.1 millimeters of mercury at 20 degrees Celsius; or (2) Consists of more than 12 carbon atoms, if the vapor pressure is unknown; or (3) Has a melting point higher than 20 degrees Celsius and does not sublime (i.e., does not change directly from a solid into a gas without melting), if the vapor pressure is unknown.

or, they must have been excluded from the definition of "Volatile Organic Compound" such as various halogenated organic compounds; certain classes of perfluorocarbons; cyclic, branched, or linear completely methylated siloxanes; waxes; or low-reactive organic compounds that have been exempted by the United States Environmental Protection Agency.

Additionally, for use in the compositions of this invention, these additives cannot interact with the silicone fluids, acids or the solid stabilizers employed in the compositions of this invention or with the effective application of the compositions to the surface to be treated. Examples of additives which meet all the criterion would be perchloroethylene, parachlorobenzotrifluoride (Oxsol 100, supplied by Occidental Chemical Corporation), decamethylcyclopentasiloxane, diethyleneglycol dibutylether (vapor pressure less than 0.01 mm Hg at 20 degrees Celsius), linear alkylbenzene sulfonate, glycerylmonostearate, stearic acid, hydrocarbon waxes, and the like.

Ancillary additives such as fragrances or colorants may also be added to the compositions of this invention to enhance the features of the compositions for various markets.

The principles of this invention and its parameters will be further understood with reference to the following detailed examples, procedures and discussion which serve to illustrate the types of materials and processes which can be utilized in practicing this invention. These examples and procedures are considered to be exemplary of this invention, and should not be considered as limiting in view of the broad disclosure of the principles of this invention.

EXAMPLES AND PROCEDURES

A. TESTING PROCEDURES

1. Application of Water and Soil Repellent Silicone Compositions to Nonporous Surfaces Glass mirrors (12"×12") were employed in the general testing program and are cleaned with an abrasive cleanser, i.e., "Miracle Scrub", an excellent, multi-surface, hard surface abrasive cleaner supplied by Unelko Corporation of Scottsdale, Ariz., to remove all surface residues including prior water and soil repellent compositions. The cleanser is removed from the cleaned surface by flushing with water. If the surface is properly cleaned, the rinse water will form a continuous smooth coating of water across the cleaned surface of the glass. The mirrors are then placed in a vertical position to drain and then dried with paper towels. The cleaned mirror surface is then allowed to equilibrate with the atmosphere for 24 hours prior to the application and evaluation of the water and soil repellent compositions.

Other nonporous surfaces such as porcelain, ceramic tiles, chrome, stainless steel, plastics and the like may also be employed in the evaluation of water and soil repellent compositions.

Application of the silicone compositions to the horizontal, cleaned mirror surface may be accomplished in various ways. With the currently available alcoholic silicone compositions, it is generally recommended by the suppliers to apply an excess of the liquid to the surface to be treated and then spread the liquid over the surface with an applicator such as a paper towel or cloth in order to cover the entire surface with the solution. The solvent is then allowed to evaporate which results in a hazy surface. The haze is then polished until the surface is clear with a dry applicator.

With the compositions of this invention it has been found that only a small amount of the composition need be applied to the mirror surface or to the applicator since the effective coverage has been found to be about 1000 sq feet per ounce of material, i.e., 30 milligrams/sq foot. Currently available solvent-based silicone compositions are claimed by suppliers to cover about 25 sq feet per ounce of material.

Applicators that have been found to be adequate for the compositions of this invention include paper towels, cloths, sponges, foamed plastics and the like. Acid resistant applicators are preferred for repeated applications of the acidic compositions. The compositions are wiped onto the mirror surface until clear, and a smooth homogeneous coating is achieved. This is basically a one step process as there is no waiting for solvent evaporation and no residual haze which has to be removed in a second wiping of the surface as occurs with the application of solvent based compositions. The coated mirror surfaces are then ready for testing of repellency and durability.

2. Evaluation of Coating for Water Repellency and Durability a. Water Drop Test: Several drops of water are applied in a line across the mirror surface with the surface in a horizontal position. The contact angle of the drops are observed and the repellency ranked as

| Excellent: | Compact, well rounded, bright sparkle with excellent contact angle (95 + degrees) |
|---|---|
| Good: | Somewhat less rounded with slight spread, bright with good contact angle (85–95 degrees) |
| Fair: | Slight flattening with some spread and only fair contact angle (70–85 degrees) |
| Poor: | Flat with spread and poor contact angle (70 degrees or less) | b. Drop Mobility Test: The mirror is then slowly raised on the end that parallels the line of the drops placed on the treated surface. The angle of the mirror or the height of the raised edged of the mirror from the flat supporting surface at which time the drops begin to flow down the inclined mirror is observed. The smaller the angle or the height of the edge, the better the repellency and contact angle. The following ranking is employed:

| Excellent: | 0 to 10 degree incline(0" to 2" raised edge height) |
|---|---|
| Good: | 10 to 20 degree incline (2" to 3 ½" raised edge height) |
| Fair: | 20 to 30 degree incline (3 ½" to 5" raised edge height) |
| Poor: | Greater than 30 degree incline (greater than 5" raised edge height) | c. Spray and Blow Test: A spray bottle fitted with an adjustable sprayer set to deliver a spray or fine stream of water is employed in this test. The coated mirror is again placed in a horizontal position and 4 to 5 pumps of water spray/stream are delivered to the surface of the mirror test specimen with the stream in a slightly raised position from horizontal. The spray droplets are then observed over the area sprayed. The droplets are varied in size and are ranked in the same matter as the Water Drop Test above with the additional observation as to the abundance of the smaller drop sizes.

| | |
|---|---|
| Excellent: | Drops are compact, well rounded, bright sparkle with excellent contact angle and a large number of fine drops in the spray pattern |
| Good: | Drops are somewhat less rounded with slight spread, bright with good contact angle and a fair number of fine drops in the spray pattern |
| Fair: | Drops have slight flattening with some spread and only fair contact angle and small number of fine drops in the pattern |
| Poor: | Drops are flat with spread and poor contact angle |

After the spray pattern of drops are evaluated the blow test is conducted. The ease with which the drops will flow in the direction of the air blow and the degree of blow hardness is noted:

| | |
|---|---|
| Excellent: | Light force blow and easy flow of drops |
| Good: | Moderate force blow and fairly easy flow of drops |
| Fair: | Increased force blow and slow flow of drops |
| Poor: | Forceful blow and difficult flow of drops | d. Marker Repellency and Detergent Durability Test: A paper towel dipped in a strong basic detergent solution, i.e., a 50% aqueous solution of "Easy Green", a heavy grease and stain cleaner composition supplied by Unelko Corporation, Scottsdale, Ariz., is rubbed vigorously on half of the coated surface of the mirror. The excess detergent is removed from the surface with a water rinse and hand wash to assure that all the detergent has been removed. The mirror is then dried with a paper towel. To determine the degree of residual repellency a black "Magic Marker", i.e., as supplied by Dennison Stationary Products Co., Framingham, Mass., is stroked across the unwashed coated surface and then across the washed coated surface and the streak observed. On an "Excellent" water repellent and soil repellent coating the marker will leave only a trail of fine droplets and a streak which is hardly visible. For a "Good" evaluation the streak will have slightly larger drops but no streaks. For a "Fair" evaluation the drops will again be larger but the streak may have light solid streaks of black. And, for a "Poor" evaluation the streak will be essentially solid with perhaps a few large drop areas. Most coatings based on the compositions and methods of this invention have both "Excellent" Marker Repellency and "Excellent" Detergent Durability ratings.

It has also been observed that the mirror coatings resulting from the application of the compositions of this invention generally result in a mirror surface that is brighter in appearance and one that also appears to have been restored as noted by the disappearance of minor scratches from the surface of the glass. It is believed that this is due to a multimolecular complex coating being deposited on the glass surface by the compositions of this invention. Thin monomolecular coatings are thought to be deposited from solvent systems which do not result in restorative features to the glass surface.

B. EXAMPLES

Example 1

Phase Performance Test

To demonstrate the necessity for the intimate mixing of the silicone with the acid to achieve the desired performance in water and soil repellent compositions, the solvent was evaporated from 100 gms "Invisible Shield" ("Invisible Shield" is an anhydrous ethanolic solution of a dimethylsiloxane polymer reaction product with sulfuric acid, a commercially available water and soil repellent for shower doors, ceramic tile, etc., marketed by the Unelko Corporation, Scottsdale, Ariz.) by gently heating in a beaker on a hot plate with magnetic stirring and an air stream to assist in the solvent evaporation. As the solvent was removed the solution became cloudy and when a constant weight of 8.29 gms was obtained there were two phases. The lower phase was about one milliliter and strongly acidic. The upper layer was about eight milliliters and appeared as a silicone fluid. The lower layer was removed carefully with a pipette and the exterior of the pipette wiped of the upper layer with a paper towel. The lower layer and the upper layer were then applied to a glass mirror surface along with the original "Invisible Shield" to determine the Water and Soil Repellency and Durability of each. The results are presented in Table A.

It is apparent from the test results that the silicone component and the acid component of the composition do not perform as water and soil repellent compositions and that the combination of the two, as in the "Invisible Shield" product, results in "Excellent" test results.

TABLE A

| | Phase Performance Test | | |
|---|---|---|---|
| APPLICATION | UPPER LAYER Smooth, Renovates | INVISIBLE SHIELD Smooth Does not renovate | LOWER LAYER Difficult, Hazy |
| Drop Contact Angle | P | E | F |
| Drop Mobility | P | E | P |
| Spray | P | E | F |
| Blow | F–P | E | G |
| Marker Repellency | F | E | P |
| Detergent Durability | F | E | P |

E = Excellent,
G = Good,
F = Fair,
P = Poor

Examples 2 to 8

Compositions Utilizing Various Solid Stabilizers 40 gms of a modified dimethysiloxane fluid (Wacker F-1 006, 60,000 mol. wt.) and the solid stabilizers were hand blended to a homogeneous mixture in an 8 oz bottle with a stainless steel spatula. 5 gms of concentrated sulfuric acid was then added, and the mixture was again hand blended to a homogeneous composition. The blends were evaluated on the water repellency and durability tests by placing a small amount of the blend on the spatula and depositing it on the test mirror surface followed by spreading and wiping with a paper towel to cover the test surface. The blends did not leave a hazy test surface but wiped clean and bright. Table B presents the results of the Water and Soil Repellency and Durability Tests on these blends.

"Excellent" to "Good" Water and Soil Repellency and Durability results were obtained on all of the examples. This demonstrates that the same silicone fluid and acid combination can be used with a broad range of different solid stabilizers and quantities to give the desired durable water and soil repellent compositions of this invention in the forms from creams to pastes to semi solids.

TABLE B

Performance of a Silicone Fluid/Acid Combination with Various Solid Stabilizers

| | EXAMPLE | | | | | | |
|---|---|---|---|---|---|---|---|
| | 2 | 3 | 4 | 5 | 6 | 7 | 8 |
| | Stabilizer (gms)* | | | | | | |
| | SynWax | PP-31 (4) | PE611XF (4) | CaSO$_4$ (4) | Sil 90 (50) | 68-S (60) | V-4 (14) (25) |
| EVALUATIONS | Cream | Cream | Cream | Semisolid | Paste | Semisolid | Semisolid |
| Drop Contact Angle | E | E | E | G | E | E | E |
| Drop Mobility | E | E | E | G–F | E | E | E |
| Spray | E | E | E | G | E | E | E |
| Blow | E | E | E | F | G | G | G |
| Marker Repellency | E | E | E | G | E | E | E |
| Detergent Durability | E | E | E | G | E | E | E |

E = Excellent, G = Good, F = Fair, P = Poor
*SynWax = SynWax 22 XF a micronized synthetic hydrocarbon wax (Micro Powders, Inc.) (5–6 microns)
PP-31 = Propylmatte 31, a micronized polypropylene (Micro Powders, Inc.) (8–12 microns)
PE611XF = MPP-611XF, a micronized polyethylene (Micro Powders, Inc.) (5–6 microns)
CaSO4 = Powdered Gypsum
Sil 90 = Silcosil 90, a ground silica (U.S. Silica Co.) (80% less than 325 mesh)
68-S = Therm-O-Rock 68S, a ground perlite (Therm-O-Rock West) (20–200 mesh)
V-4 = Therm-O-Rock V-4, a ground mica (Therm-O-Rock West)

Examples 9 to 20

Compositions of Various Silicones with Sulfuric Acid and Various Solid Stabilizers The various silicones presented in Table C were hand mixed with the amount of sulfuric acid stated and then hand blended with the amount of the various solid stabilizers as shown. The resulting compositions were then tested for Water and Soil Repellency and Durability and the results are presented in Table C.

"Excellent" Water and Soil Repellency and Durability tests results were obtained on all the compositions. This demonstrates the broad range of silicones and solid stabilizers which can be employed to achieve the durable water and soil repellent compositions of this invention.

TABLE C

Performance of Various Silicone Fluids with Various Solid Stabilizer Compositions

| EXAMPLE | 9 | 10 | 11 | 12 | 13 | 14 | 15 |
|---|---|---|---|---|---|---|---|
| Silicones/Acid* (gms) | | | | | | | |
| F 1006 | 60 | 15 | 33.6 | 30 | 15 | 150 | 13.3 |
| 50 Cst. | 15 | 5 | 13.3 | 10 | 5 | | 4.4 |
| VS 7349 | | 20 | | | | | |
| F 1079 | | | | | | 50 | |
| Sulfuric Acid | 8 | 2 | 4.5 | 4 | 2 | 32 | 2.3 |
| Stabilizer (gms)** | Mica 3X (140) | Mica 3X (42) | W 1300 (36.7) | SynWax (10) | G 146 (7) | K-1 (22) MT 10 (5) | MT 10 (2) |
| EVALUATIONS | Paste | Paste | Paste | Cream | Cream | Semi-solid | Semi-solid |
| Drop Contact Angle | E | E | E | E | E | E | E |
| Drop Mobility | E | E | E | E | E | E | E |
| Spray | E | E | E | E | E | E | E |
| Blow | E | E | E | E | E | E | E |
| Marker Repellency | E | E | E | E | E | E | |
| Detergent Repellency | E | E | E | E | E | E | E |

E = Excellent, G = Good, F = Fair, P = Poor
*F 1006 = Modified dimethylsiloxane fluid (Wacker)
50 Cst = SWS 101, 50 centistoke dimethylpolysiloxane fluid (Wacker)
VS 7349 = Cyclic tetra/penta/polymethylsiloxane mixture (Witco Chemical)
F 1079 = Dimethylpolysiloxane fluid containing cyclic siloxanes (Wacker)

TABLE C-continued

Performance of Various Silicone Fluids with
Various Solid Stabilizer Compositions

**Mica 3X = Micronized mineralite mica (H. M. Royal of CA, Inc.) (7–11 microns)
W-1300 = Z Light Ceramic Spheres (3M) (Avg. 125 microns)
MT-10 = Reolosil MT-10, hydrophobic silica (H. M. Royal of CA, Inc.) (Avg. 150 m$\mu$)

| EXAMPLE | 16 | 17 | 18 | 19 | 20 |
|---|---|---|---|---|---|
| Silicones/Acid (gms)* | | | | | |
| F 1006 | 13.3 | 20 | | | 50 |
| 50 Cst | 4.4 | | | | |
| 100 Cst | | 6.7 | | | |
| 350 Cst | | | 20 | | 10 |
| Monomer | | | | 20 | |
| Sulfuric Acid | 2.3 | 3.3 | 2 | 2 | 6 |
| Stabilizer (gms)** | G-146 | K-1 | K-1 | K-1 | W-1012 |
|  | (5) | (5) | (3) | (5) | (20) |
| EVALUATIONS | Cream | Paste | Cream | Semi-solid | Paste |
| Drop Contact Angle | E | E | E | E | E |
| Drop Mobility | E | E | E | E | E |
| Spray | E | E | E | E | E |
| Blow | E | E | E | G | E |
| Marker Repellency | E | E | E | E | E |
| Detergent Durability | E | E | E | E | E |

E = Excellent, G = Good, F = Fair, P = Poor
*100 Cst = SWS 101, 100 centistoke dimethylpolysiloxane fluid (Wacker)
350 Cst = SWS 101, 350 centistoke dimethylpolysiloxane fluid (Wacker)
Monomer = Dimethyldiethoxysilane (Genesee)
**G-146 = Natural crystalline flake graphite (Asbury Graphite Mills, Inc.) (98% less than 44 microns)
W-1012 = Z-light Ceramic Microspheres (3M) (Avg. 44 microns)

Examples 21 to 25

Combinations of Various Silicone Fluids and Solid Stabilizers with Other Strong Acids Various strong acids presented in Table D were hand mixed with the various amounts of the silicone fluids and solid stabilizers as shown. The resulting compositions were then tested for Water and Soil Repellency and Durability and the results are presented in Table D.

"Excellent" to "Good" Water and Soil Repellency and Durability test results were obtained on all the compositions. This further demonstrates the broad use of strong acids with various silicone fluids and solid stabilizers which can be employed to achieve the durable water and soil repellent compositions of this invention.

TABLE D

Compositions Employing Other Strong Acids

| EXAMPLE | 21 | 22 | 23 | 24 | 25 |
|---|---|---|---|---|---|
| Blend(gms) | | | | | |
| Silicones | | | | | |
| F 1006 | 15 | 15 | 40 | | 20 |
| 100 Cst | | | | 50 | |
| 350 Cst | 5.8 | 5 | | | |
| Acids | | | | | |
| Trifluoromethane Sulfonic | 4.3 | | | | |
| Ethane Sulfonic(70% aq) | | 4 | | | |
| Ammonium Bifluoride | | | 6* | | |
| Oleum (H2SO$_4$ + SO$_3$) | | | | 7 | |
| p-Toluenesulfonic Acid | | | | | 2.5** |
| Stabilizer | K-1 | K-1 | PP-31 | SynWax | Mica 3X |
|  | (3) | (2) | (24) | (20) | (22.5) |
| EVALUATIONS | Cream | Cream | Cream | Cream | Paste |
| Drop Contact Angle | E | E | E | E | E |
| Drop Mobility | G | E | E | E | G |
| Spray | E | E | E | E | E |
| Blow | E | E | E | E | E |
| Marker Repellency | G | G | E | E | G |
| Detergent Durability | G | G | G | E | G |

E = Excellent,
G = Good,
F = Fair,
P = Poor
*20 gms of ammonium bifluoride crystal was intensely blended in a Waring type blender with 80 gms of Propylmatte 31 30 gms of the blended composition was employed in blend 23
**10 gms of p-toluenesulfonic acid was intensely blended in a Waring type blender with 90 gms of Mica 3X (micronized mica) 25 gms of the blended composition was employed in blend 25

Examples 26 to 31

Compositions of Various Additives with a Silicone Fluid Blend with Sulfuric Acid and Various Solid Stabilizers Various silicone fluid/sulfuric acid/solid stabilizer blends were hand mixed and then blended with the various additives as shown in Table E.

Example 26

The silicone and acid were reacted by hand blending and the mica added and mixed to a stiff paste. The DBDEG was then added to yield a less stiff paste.

Example 27

The silicone, S-100, the acid and the K-1 glass spheres were all mixed together to yield a soft paste.

Example 28

The stearic acid and the silicone were hand mixed hot. Two liquid phases resulted. The acid and the K-1 glass spheres were added to the hot two phases and hand mixed. The mixture was then cast into a plastic mold and allowed to solidify.

Example 29

The GMS, silicone and acid were hand mixed hot. Two liquid phases resulted. The Mica 3X was then added to the hot two phases and hand mixed. The mixture was then cast into a plastic mold and allowed to solidify.

Example 30

The Wax 180, silicone and acid were hand mixed hot. Two liquid phases resulted. The Mica 3X was then added to the hot two phases and hand mixed. The mixture was then cast into a plastic mold and allowed to solidify.

Example 31

The Wax 835, silicone and acid were hand mixed not. Two liquid phases resulted. The Mica 3X was then added to the hot two phases and hand mixed. The mixture was then cast into a plastic mold and allowed to solidify.

The resulting compositions in the above Examples 26–31 were then tested for Water and Soil Repellency and Durability and the results are presented in Table E.

"Excellent" to "Good" Water and Soil Repellency and Durability test results were generally obtained on all of the compositions. This further demonstrates the broad use of the compositions of this invention in the preparation of various forms of durable water and soil repellent compositions that can be achieved by the teachings of this invention.

TABLE E

Liquid and Solid Additive Compositions

| EXAMPLE | 26 | 27 | 28 | 29 | 30 | 31 |
|---|---|---|---|---|---|---|
| Silicones(gms) | | | | | | |
| F 1006 | 15 | 16.6 | 6 | 6 | 12 | 12 |
| 50 Cst | 5 | 5.6 | 2 | 2 | 4 | 4 |
| Sulfuric Acid(gms) | 2 | 3.5 | 0.8 | 0.8 | 1.6 | 1.6 |
| Stabilizer(gms) | Mica 3X (120) | K-1 (8) | K-1 (2) | Mica 3x (30) | Mica 3X (50) | Mica 3X (50) |
| Additive(gms)* | DB-DEG (22) | S-100 (25) | Stearic Acid (10) | GMS (10) | Wax 180 (20) | Wax 835 (20) |
| Procedure | Hand mixed | Hand mixed | Melted, Mixed, Solidified | Melted, Mixed, Solidified | Melted, Mixed, Solidified | Melted, Mixed, Solidified |
| EVALUATIONS** | | | | | | |
| Drop Contact Angle | G | E*** | G | E*** | E | E |
| Drop Mobility | F | E | G | E | E | E |
| Spray | E | G | G | E | E | E |
| Blow | E | G | G | E | G | G |
| Marker Repellency | E | E | E | E | E | E |
| Detergent Durability | E | E | E | E | E | E |

E = Excellent,
G = Good,
F = Fair,
P = Poor
*DBDEG = Dibutyldiethyleneglycol (Grant Chemical)
S-100 = Biosoft 100, Linear alkylbenzenesulfonate
GMS = Glycerolmonostearate (Emery Industries)
Wax 180 = Hard Wax Hydrocarbon 180 (Witco)
Wax 835 = Soft Wax Hydrocarbon 835 (Witco)
**Solids were applied by swiping the solid several times across the mirror surface and then spreading the material applied with a paper towel across the surface of the mirror until clear
***E ratings were obtained after a water wash of the surface to remove residual S-100 and GMS which are known wetting agents that tend to reduce water repellency

Example 32

Performance on Glazed Ceramic Tile

The composition of Example 12 (30 gms F 1006, 10 gms 50 Cst, 4 gms Sulfuric Acid, 10 gms SynWax) was applied to half of a 12"×12" glazed ceramic tile in the same manner as when applied to a glass mirror surface. The other half of the tile was untreated for comparison. Both sides of the tile were then tested for Water and Soil Repellency and Durability of the treated and untreated surfaces. The results are presented in Table F.

"Excellent" to "Good" Water and Soil Repellency and Durability test results were obtained for the treated side of the glazed tile. Two "Fair" and four "Poor" test results were obtained for the untreated glazed tile surface. This demonstrates the further utility of the compositions of this invention to treat nonporous surfaces.

TABLE F

Treatment of Glazed Ceramic Tile

| APPLICATION (with paper towel) | TREATED SURFACE Smooth Surface | UNTREATED SURFACE Some Surface Drag |
|---|---|---|
| Drop Contact Angle | E | F |
| Drop Mobility | G | F |
| Spray | E | P |
| Blow | E | P |
| Marker Repellency | E | P |
| Detergent Durability | G | P |

E = Excellent,
G = Good,
F = Fair,
P = Poor

Example 33

High Intensity Blender Preparation of Durable Water and Soil Repellant Compositions 29 gms. of hollow glass bubbles (K-1 from 3M) were placed into the Waring type blender and the top cover, modified with a small hole for the injection of liquids, put in place to seal the blender. The blender was then turned on at a moderate blending speed and 50 gms of silicone fluid (50

Cst, Wacker Silicones) was added slowly over a few minutes by means of a syringe through the addition hole in the blender top. 150 gms of a modified dimethylsilicone fluid (F-1006, Wacker Silicones) was then added in a similar manner with continuous blending. The total mix was blended for an additional one minute. The blender was then opened and the sides of the blender scraped with a rubber spatula and then the blender was turned on for an additional minute of mixing. A smooth cream textured mix was obtained.

25 gms of concentrated sulfuric acid was then added with blending in a similar manner. The mix thickened and then thinned to a creamy paste. The blender was stopped and the top cover was removed and 5 gms of a fine silica (MT-10, H. M. Royal of CA, Inc.) was added on top of the paste. The blender was again turned on for an additional minute. The resulting mix was a smooth semisolid paste.

Testing of the resulting material for Water and Soil Repellency and Durability resulted in "Excellent" results in all test categories.

Example 34

Coverage Determination 0.68 gms of a blend of 60 gms of a functional dimethylsilicone fluid (F-1006), 15 gms of a 50 Cst dimethylsilicone fluid, 8 gms of sulfuric acid and 140 gms Mica 3X was applied on the surface of a 1.63 gm polyolefin closed cell foam sponge. A large sheet of window glass was then coated with the material by wiping the sponge over the surface using a firm, circular, and overlapping motion. The point at which the glass was sufficiently treated was easily determined by the ease of movement of the sponge over the surface of the glass. The area of the coated glass was then determined by spraying with water. An area of about 27"× 15" was determined to have a water and soil repellent coating. The sponge was then weighed again and it was determined that only 0.08 gms of the water and soil repellent composition had been used to coat the treated area.

This result calculates to a coverage of approximately 1000 sq ft per ounce of material, compared to a coverage of 25 sq ft per ounce for typical solvent based compositions.

Example 35

Water and Soil Repellent Composition Paste

In this example, a semi-solid paste was made with a liquid additive to illustrate a composition which does not require the advantage of being solventless. However, in this form of a paste, other advantages of this invention are secured. The stabilizing effect of the solid stabilizer is achieved for the two dispersed phases of silicone and acid, each or both of which have been extended with ethanol.

105 gms of "Invisible Shield", a commercially available solvent based water and soil repellent composition described previously, was placed in a beaker with a magnetic stirrer and heated on a hot plate with a stream of air passing over the surface to assist in the evaporation of the solvent. Solvent was removed until two phases were observed when the mixture turned cloudy.

The residual weighed 15.29 gms and was about a 60/40 volume split between upper and lower layers. It was previously determined that "Invisible Shield" contained 8.29% non volatile liquids and therefore the non volatile components in this experiment would be 8.70 gms. This result indicates that there were 6.59 gms of ethanol remaining in the two-phase 15.29 gm residue.

10 gms of SynWax 22 XF were hand blended with the 15.29 gm residue to yield a semi-solid paste containing a dispersion of the two phases stabilized by the wax. An ethanol odor was noted from the blended composition on application to the mirror surface for testing. However, no haze developed on application of the composition to the mirror surface. "Excellent" results were obtained on all Water and Soil Repellency and Durability tests.

This example further demonstrates the broader aspect of the invention for the application of a composition containing a dispersion of two phases, in the presence of a liquid additive, and a solid stabilizer in an effective amount to stabilize the dispersion.

Example 36

Powdered Water and Soil Repellent Composition 40 gms of F 1006, a modified dimethylsiloxane fluid supplied by Wacker, and 5 gms of concentrated sulfuric acid were hand mixed in an 8 ounce bottle with a stainless steel spatula. The mixture thickened and was slightly exothermic. On continued mixing the mixture thinned and separated into two phases on standing.

50 gms of finely ground pearlite (Thermolite T-100 supplied by Therm-O-Rock West of Phoenix, Ariz.) was placed in a Waring blender and 16 gms of the F 1006/Sulfuric Acid blended reaction product added slowly through the addition hole in the top of the blender by means of a syringe while blending continuously at a moderate speed. The blender was then opened and the sides of the blender scraped with a rubber spatula and the blender was again turned on for additional blending. A powdered composition resulted.

The resulting powder was applied to a glass mirror and spread across the surface of the mirror with a dry sponge. The excess powder was then removed and the coated mirror tested for Water and Soil Repellency and Durability. The results are presented in Table G.

TABLE G

Powdered Composition Water and Soil
Repellency and Durability Test Results

| TEST | RESULT |
|---|---|
| Drop Contact Angle | E |
| Drop Mobility | G |
| Spray | E |
| Blow | E |
| Marker Repellency | G |
| Detergent Durability | G |

E = Excellent,
G = Good

"Excellent" to "Good" results were obtained on the Water and Soil Repellency and Durability Test for the powdered water and soil repellent composition.

Example 37

Textured Surface Performance

A 12"×12" piece of sandblasted glass (one side) was divided into three sections. One section was treated three times with "Invisible Shield", a solvent based composition, allowing the surface to dry between applications. Another section was treated with the composition of Example 12 (a cream) (30 gms F1006, 10 gms 50 cst, 4 gms sulfuric acid, 10 gms SynWax) and another section was untreated. The sections were evaluated on the Water and Soil Repellency and Durability Test and the results are summarized in Table H.

TABLE H

Treatment of Textured Surface

| MATERIAL | EXAMPLE 12 (Cream) | INVISIBLE SHIELD (Solvent Based) | NONE |
|---|---|---|---|
| Drop Contact Angle | E | F | F |
| Drop Mobility | G | F | P |
| Spray | E | F | F |
| Blow | F | P | P |
| Marker Repellency | F* | F* | P |
| Detergent Durability | F* | F | P |

E = Excellent,
G = Good,
F = Fair,
P = Poor
*Marker can be removed from the surface by rubbing with a paper towel The performance of the cream, Example 12 composition, on the water and soil repellency tests was superior to the solvent-based material, "Invisible Shield" and both were an improvement over the untreated surface.

The surface treated with the cream still outperformed the solvent based material in the detergent durability test in that the black streak from the marker could be easily removed from the surface by rubbing with a paper towel whereas the solvent based treated surface streak could not be removed.

Those of ordinary skill in the art realize that the descriptions, procedures, methods and compositions presented above can be revised or modified without deviating from the scope of the described embodiments, and such do not depart from the scope of the invention.

What is claimed is:

1. A solventless composition for rendering nonporous surfaces water and soil repellent consisting essentially of
   a multi-phase dispersion of a silicone and an acid, and
   a solid stabilizer distributed in the multi-phase dispersion in an effective amount to (a) stabilize the dispersion against separation, and (b) render said surfaces water and soil repellent, said composition being essentially free of a solvent.

2. The composition of claim 1 wherein said solid stabilizer is in an amount of from about 5 to about 85 percent by weight.

3. The composition of claim 1 wherein the solid stabilizer consists of particles having an average size of less than about 100 microns.

4. The composition of claim 3 wherein the particle size is on the order of about 5 to about 50 microns.

5. The composition of claim 1 wherein said solid stabilizer has a specific gravity on the order of about 0.12 to about 2.9 gms/cc.

6. The composition of claim 1 wherein the solid stabilizer consists of particles having a specific gravity on the order of about 0.12 to about 2.9 gms/cc and a particle size of less than about 100 microns.

7. The composition of claim 6 wherein the particle size is on the order of about 5 to about 50 microns.

8. The composition of claim 1 wherein the silicone is defined by the formula:

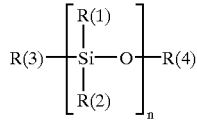

in which
n is an integer from 1 to about 1000,
R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and
R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenoxy, halogenated alkylphenoxy, and combinations thereof.

9. The composition of claim 1 wherein the silicone is a silicone fluid selected from the group consisting of polydialkylpolysiloxanes, polyalkylpolyalkoxypolysiloxanes, polyalkylhydrogensiloxanes, polyalkyarylpolysiloxanes, fluoro-substituted alkypolysiloxanes, cyclic siloxanes, and combinations thereof, and copolymers thereof.

10. The composition of claim 1 wherein the silicone is an alkylpolysiloxane wherein the alkyl group contains from 1 to 8 carbon atoms.

11. The composition of claim 1 wherein the acid is selected from the group consisting of a mineral acid, an organic acid and salts thereof.

12. The composition of claim 1 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

13. The composition of claim 1 wherein the solid stabilizer is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

14. The composition of claim 13 wherein the solid stabilizers have a particle size of less than about 100 microns and a specific gravity of about 0.12 to about 2.9 gms/cc.

15. The composition of claim 1 wherein the silicone is in an amount of about 20 to about 85 percent by weight, the acid is in an amount of about 2 to about 20 percent by weight, and the solid stabilizer is in the amount of about 5 to about 85 percent by weight, the total of said amounts not to exceed 100% by weight.

16. A composition in the form of a cream, paste or powder for rendering nonporous surfaces water and soil repellent consisting essentially of a multi-phase dispersion of a silicone and an acid, and a solid stabilizer distributed in the multi-phase dispersion in an effective amount to (a) stabilize the dispersion against separation and to form a cream, paste or powder, and (b) render said surfaces water and soil repellent.

17. The composition of claim 16 wherein said solid stabilizer is in an amount of from about 5 to about 85 percent by weight.

18. The composition of claim 16 wherein the solid stabilizer consists of particles having an average size of less than about 100 microns.

19. The composition of claim 16 wherein the particle size is on the order of about 5 to about 50 microns.

20. The composition of claim 16 wherein said solid stabilizer has a specific gravity on the order of about 0.12 to about 2.9 gms/cc.

21. The composition of claim 16 wherein the solid stabilizer consists of particles having a specific gravity on the order of about 0.12 to about 1.8 gms/cc and a particle size of less than about 100 microns.

22. The composition of claim 21 wherein the particle size is on the order of about 5 to about 50 microns.

23. The composition of claim 16 wherein the silicone is defined by the formula:

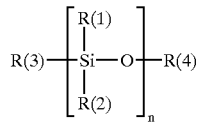

in which n is an integer from 1 to about 1000,

R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and R(3) and R(4) are independently alkyl, substituted alkyl, alkenyl, halogenated alkyl, phenyl, alkylphenyl, substituted phenyl, cyclosiloxyl, hydroxyl, halogen, hydrogen or alkoxy, phenoxy, substituted alkoxy, substituted phenoxy, halogenated phenoxy, halogenated alkylphenoxy, and combinations thereof.

24. The composition of claim 16 wherein the silicone is a silicone fluid selected from the group consisting of polydialkylpolysiloxanes, polyalkylpolyalkoxypolysiloxanes, polyalkylhydrogensiloxanes, polyalkyarylpolysiloxanes, fluoro-substituted alkypolysiloxanes, cyclic siloxanes, and combinations thereof, and copolymers thereof.

25. The composition of claim 16 wherein the silicone is an alkylpolysiloxane wherein the alkyl group contains from 1 to 8 carbon atoms.

26. The composition of claim 16 wherein the acid is selected from the group consisting of a mineral acid, an organic acid and salts thereof.

27. The composition of claim 16 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

28. The composition of claim 16 wherein the solid stabilizer is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

29. The composition of claim 28 wherein the solid stabilizers have a particle size of less than about 100 microns and a specific gravity of about 0.12 to about 2.9 gms/cc.

30. The composition of claim 16 wherein the silicone is in an amount of about 20 to about 85 percent by weight, the acid is in an amount of about 2 to about 20 percent by weight, and the solid stabilizer is in the amount of about 5 to about 85 percent by weight, the total of said amounts not to exceed 100% by weight.

31. A process of rendering the surface of a nonporous substrate water, soil and stain repellent comprising treating the substrate surface with a composition in the form of a solventless composition, a cream, a paste or a powder consisting essentially of a multi-phase dispersion of a silicone and an acid, a solid stabilizer distributed in the multi-phase dispersion in an effective amount to (a) stabilize the dispersion against separation and (b) render said substrate water, soil and stain repellent, forming a water, soil and stain repellent coating on said substrate.

32. The process of claim 31 wherein the substrate is selected from the group consisting of glass, porcelain, ceramic, metal, coated metal, and plastic, and the coating is optically clear.

33. The process of claim 31 wherein said coating is a multi-molecular layer which hides or fills fine scratches and other defects in the nonporous surface and results in a restored appearance to the surface.

34. The process of claim 33 wherein the substrate is selected from the group consisting of glass, porcelain, ceramic, metal, coated metal, and plastic.

35. The process of claim 34 wherein the substrate is textured.

36. The process of claim 35 wherein the substrate is glass.

37. The process of claim 31 which involves a one step application of the composition and wiping until clear without the formation of an intermediate haze.

38. The process of claim 31 wherein an optically clear multi-molecular layer of the silicone composition is provided on the substrate.

39. The process of claim 31 wherein said solid stabilizer is in an amount of from about 5 to about 85 percent by weight.

40. The process of claim 31 wherein the solid stabilizer consists of particles having an average size of less than about 100 microns.

41. The process of claim 40 wherein the particle size is on the order of about 5 to about 50 microns.

42. The process of claim 31 wherein said solid stabilizer has a specific gravity on the order of about 0.12 to about 2.9 gms/cc.

43. The process of claim 31 wherein the solid stabilizer consists of particles having a specific gravity on the order of about 0.12 to about 1.8 gms/cc and a particle size of less than about 100 microns.

44. The process of claim 43 wherein the particle size is on the order of about 5 to about 50 microns.

45. The process of claim 31 wherein the silicone is in an amount of about 20 to about 85 percent by weight, the acid is in an amount of about 2 to about 20 percent by weight, and the solid stabilizer is in the amount of about 5 to about 85 percent by weight, the total of said amounts not to exceed 100% by weight.

46. The process of claim 31 wherein the silicone is defined by the formula:

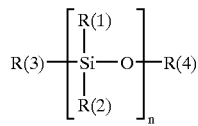

in which n is an integer from 1 to about 1000,

R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenoxy, halogenated alkylphenoxy, and combinations thereof.

47. The process of claim 31 wherein the silicone is a silicone fluid selected from the group consisting of polydialkylpolysiloxanes, polyalkylpolyalkoxypolysiloxanes, polyalkylhydrogensiloxanes, polyalkyarylpolysiloxanes, fluoro-substituted alkypolysiloxanes, cyclic siloxanes, and combinations thereof, and copolymers thereof.

48. The process of claim 31 wherein the silicone is an alkylpolysiloxane wherein the alkyl group contains from 1 to 8 carbon atoms.

49. The process of claim 31 wherein the acid is selected from the group consisting of a mineral acid, an organic acid and salts thereof.

50. The process of claim 31 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

51. The process of claim 31 wherein the solid stabilizer is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

52. The process of claim 51 wherein the solid stabilizers have a particle size of less than about 100 microns and a specific gravity of about 0.12 to about 2.9 gms/cc.

53. A composition free of volatile organic compounds (VOCs) for rendering nonporous surfaces water and soil repellent consisting essentially of a multi-phase dispersion of a silicone and an acid, and a solid stabilizer distributed in the multi-phase dispersion in an effective amount to (a) stabilize the dispersion against separation, and (b) render said surfaces water and soil repellent, said composition being essentially free of VOCs.

54. The composition of claim 53 wherein the silicone is defined by the formula:

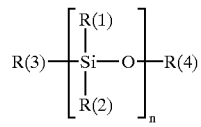

in which n is an integer from 1 to about 1000,

R(1) and R(2) are independently lower alkyl, substituted alkyl, alkenyl, halogenated alkyl, alkoxy, or halogenated alkoxy radicals containing from 1 to 8 carbon atoms; aryl, halogenated aryl, phenoxy, alkylphenoxy, halogenated phenoxy or halogenated alkylphenoxy radicals containing about 6 to 14 carbon atoms; hydrogen, hydroxy, or halogen; and combinations thereof, and R(3) and R(4) are independently alkyl, substituted alkyl, alkenyl, halogenated alkyl, phenyl, alkylphenyl, substituted phenyl, hydroxyl, halogen, hydrogen or alkoxy, phenoxy, substituted alkoxy, substituted phenoxy, halogenated phenyl, halogenated alkylphenoxy, and combinations thereof.

55. The composition of claim 53 wherein the silicone is an alkylpolysiloxane wherein the alkyl group contains from 1 to 8 carbon atoms.

56. The composition of claim 53 wherein the acid is selected from the group consisting of a mineral acid, an organic acid and salts thereof.

57. The composition of claim 53 wherein the acid is selected from the group consisting of sulfuric acid, sulfurous acid, hydrofluoric acid, hydrochloric acid, hydrobromic acid, phosphoric acid, phosphorous acid, pyrophosphoric acid, nitric acid, hydrogen sulfide, iodic acid, periodic acid, chromic acid, sulfamic acid, fluorosilicic acid, chlorosulfonic acid, fluorosulfonic acid, ammonium bifluoride, sodium bisulfate, mono- di- and trichloroacetic acid, mono- di- and trifluoroacetic acid, p-toluene sulfonic acid, benzene sulfonic acid, ethylsulfonic acid, methylsulfonic acid, ethylenedisulfonic acid, dodecylsulfonic acid, trifluoromethylsulfonic acid, perfluoroalkylcarboxylic acids, oleum, perfluoroalkylsulfonic acids, maleic acid, picric acid, trihydroxybenzoic acid, trinitrophenol and mixtures thereof.

58. The composition of claim 57 wherein the solid stabilizer is selected from the group consisting of mica, hydrocarbon waxes, polyethylene, polypropylene, polytetrafluoroethylene, phenolic resins, polyvinylchloride, crystalline graphite, amorphous graphite, carbon black, silicas, boron nitride, carnauba wax, glass microspheres, ceramic microspheres, perlite, vermiculite, talc and combinations thereof.

59. The composition of claim 58 wherein the solid stabilizers have a particle size of less than about 100 microns and a specific gravity of about 0.12 to about 2.9 gms/cc.

60. The composition of claim 53 wherein the silicone is in an amount of about 20 to about 85 percent by weight, the acid is in an amount of about 2 to about 20 percent by weight, and the solid stabilizer is in the amount of about 5 to about 85 percent by weight, the total of said amounts not to exceed 100% by weight.

* * * * *